(12) United States Patent
Lord et al.

(10) Patent No.: US 6,719,170 B2
(45) Date of Patent: Apr. 13, 2004

(54) PEN FOR DISPENSING A CURABLE LIQUID

(75) Inventors: Steven F. Lord, Rumford, RI (US); Warren N. Strong, Conventry, RI (US)

(73) Assignee: Nordson Corporation, Westlake, OH (US)

( * ) Notice: Subject to any disclaimer, the term of this patent is extended or adjusted under 35 U.S.C. 154(b) by 171 days.

(21) Appl. No.: 10/028,505

(22) Filed: Dec. 20, 2001

(65) Prior Publication Data

US 2003/0116590 A1 Jun. 26, 2003

(51) Int. Cl.[7] .................................................. G01F 11/04
(52) U.S. Cl. ......................... 222/61; 222/327; 222/389
(58) Field of Search ........................... 222/61, 325, 326, 222/327, 389

(56) References Cited

U.S. PATENT DOCUMENTS

| | | | | |
|---|---|---|---|---|
| 3,136,456 A | * | 6/1964 | Sherbondy | 222/327 |
| 3,258,176 A | * | 6/1966 | Raczynski | 222/397 |
| 3,279,660 A | * | 10/1966 | Collar | 222/397 |
| 3,921,858 A | * | 11/1975 | Bemm | 222/146.5 |
| 4,077,550 A | * | 3/1978 | van Manen | 222/327 |
| 4,231,494 A | * | 11/1980 | Greenwood | 222/325 |
| 4,634,027 A | * | 1/1987 | Kanarvogel | 222/380 |
| 5,842,326 A | * | 12/1998 | Wolf | 53/425 |
| 6,041,977 A | * | 3/2000 | Lisi | 222/389 |
| 6,575,331 B1 | * | 6/2003 | Peeler et al. | 222/389 |

FOREIGN PATENT DOCUMENTS

| | | | |
|---|---|---|---|
| EP | 351441 A1 | * 1/1990 | B65D/83/00 |

OTHER PUBLICATIONS

EFD, *Ultra™Dispense Components*, www.efd–inc.com website, 5 pgs., Nov. 2001.

* cited by examiner

Primary Examiner—Kenneth Bomberg
(74) Attorney, Agent, or Firm—Wood, Herron & Evans, L.L.P.

(57) ABSTRACT

A curable liquid dispensing pen has a pen body to which a curable liquid dispensing reservoir may be removably attached. The pen body further has a coupling which may be coupled to a source of pressurized air. The air is directed through a passage in the pen body to the reservoir. The pressurized air moves a piston in the reservoir to cause curable liquid to be dispensed from the reservoir. A controller provides a timed pulse of pressurized air to the curable liquid dispensing pen and this controls the volume of curable liquid dispensed from the reservoir.

9 Claims, 3 Drawing Sheets

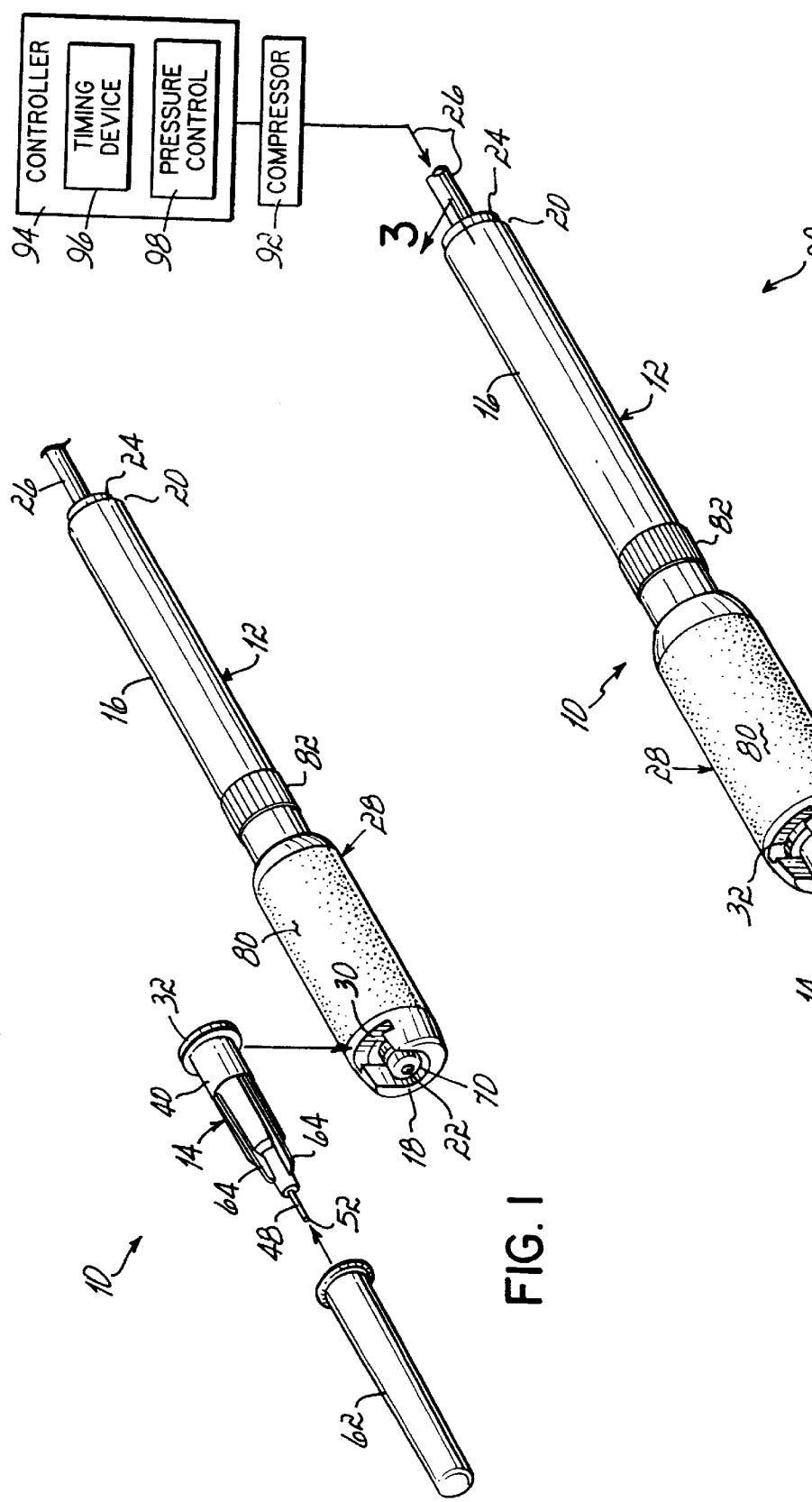

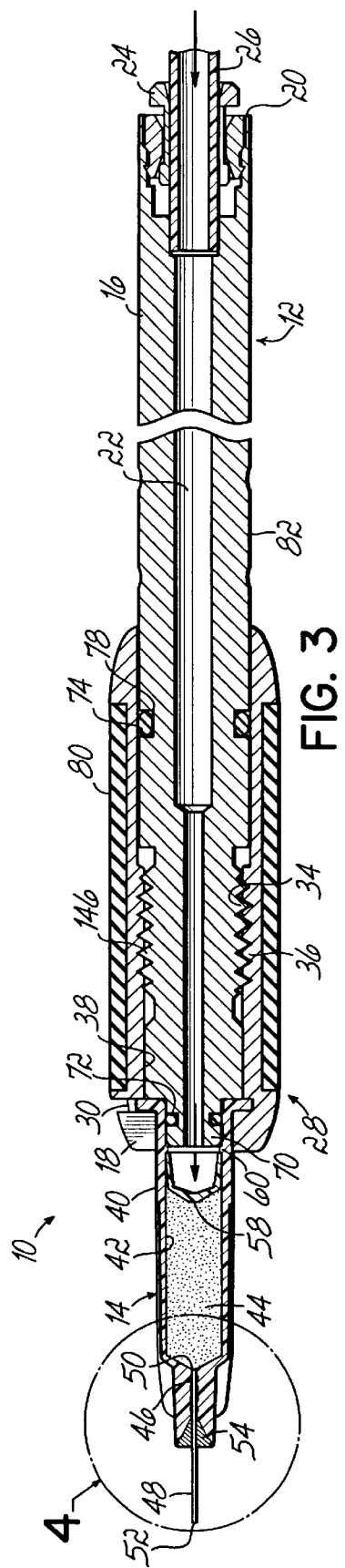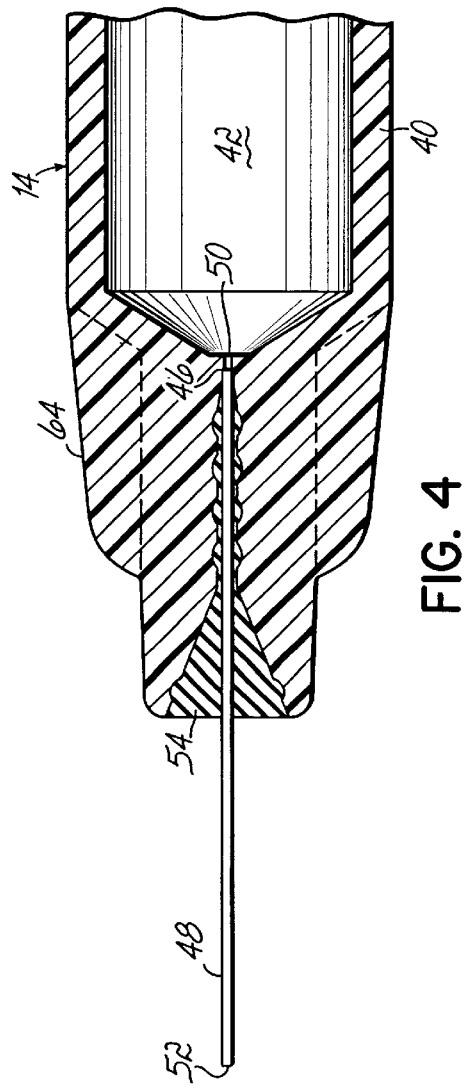
FIG. 3
FIG. 4

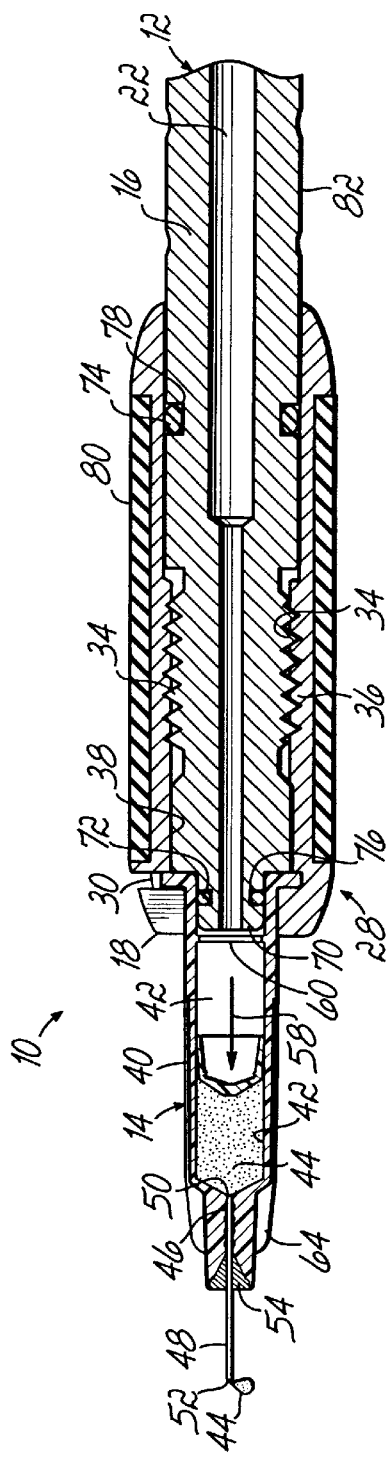
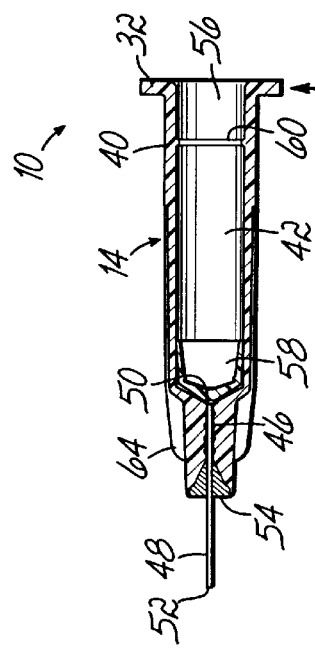
FIG. 5
FIG. 6

PEN FOR DISPENSING A CURABLE LIQUID

FIELD OF THE INVENTION

The present invention pertains to dispensing systems for flowable material, and more particularly to curable liquid dispensing systems used to accurately place small amounts of curable liquid, such as adhesive.

BACKGROUND OF THE INVENTION

In applications such as the electronics and fiber optics industries, it is necessary to join items using a very small volume of adhesive, often as small as 1 microliter, 1 nanoliter, or even less. Because the placement of items to be bonded is typically critical, such applications generally require a fast curing adhesive, such as two-part epoxy. The curable liquid may be dispensed by syringe-type applicators, utilizing manually actuated plungers, or by applicators having air actuated pistons for accurately dispensing precise amounts of curable liquid. The applicators may be hand-held for manual placement of curable liquid on a desired surface or they may be incorporated into automated curable liquid dispensing systems.

Syringe-type applicators have included an elongated barrel which serves as both a reservoir for the curable liquid and as a handle allowing the user to grasp and manipulate the applicator. The reservoirs of these syringe-type applicators are generally available with capacities as low as about 3 cc (cubic centimeters). However, they are used manually to dispense very minute amounts in successive bonding applications, for example, using magnifiers such as microscopes. Each of these minute dispensing operations takes time to ensure accuracy and may each result in depleting the reservoir by only 1 microliter (0.001 cc) or even 1 nanoliter (0.000001 cc). Thus, before depleting the entire 3 cc reservoir, a significant amount of curable liquid may cure within the reservoir. This pre-dispense curing is especially problematic with fast curing adhesives, such as two-part epoxies, and results in wasted curable liquid and, therefore, additional expense.

There is a need for a device that can dispense very small and precise amounts of curable liquid while preventing the waste of curable liquid due to pre-dispense curing.

SUMMARY OF THE INVENTION

The present invention provides a curable liquid dispensing pen which may be used to dispense very low volumes of curable liquid while reducing the amount of pre-dispense cured liquid, as compared to previously available curable liquid dispensers. The dispensing pen is particularly suited to very low volume dispensing of fast curing two-part epoxies and is configured to permit manual placement of curable liquids. Alternatively, the dispensing pen may be used with automated curable liquid placement equipment.

The invention has various aspects, but in one exemplary embodiment, the curable liquid dispensing pen of the present invention includes a pen body to which a curable liquid dispensing reservoir may be removably mounted. The pen body holds the reservoir so that the reservoir may be sized to accommodate a small volume of curable liquid, such as an amount which could be dispensed in successive dispensing operations without allowing a significant amount of the curable liquid to cure in the reservoir. For example, the reservoir may be sized to contain about 0.25 cc of curable liquid.

The reservoir is mounted to the pen body by a connecting element which is coupled to one end of the pen body. In an exemplary embodiment, the connecting element may be screwed onto the end of the pen body and has a slot which receives a flange on the reservoir. As the connecting element is screwed onto the pen body, the reservoir is brought in sealing engagement with the pen body. In this embodiment, the pen body further includes O-rings which engage the reservoir and the connecting element.

The pen body is configured to be attached to a source of compressed or pressurized air and has a passage which directs the pressurized air to the reservoir mounted on the pen body. The reservoir has an interior which contains the curable liquid. A piston within the reservoir forces curable liquid from the cavity and through an outlet tube under the action of the pressurized air. In an exemplary embodiment, a controller regulates the duration and pressure of a pulse of air acting on the piston so that the movement of the piston may be accurately controlled to dispense a precise amount of curable liquid.

In another aspect of the invention, a curable liquid dispensing reservoir is configured to be removably attached to a curable liquid dispensing pen. The dispensing reservoir generally includes a reservoir body having an interior containing a curable liquid, a first end, a second end having an opening, and a flange surrounding the opening. The flange is configured to couple with the dispensing pen in a releasable manner. An elongate tube having an inlet and an outlet is coupled with the reservoir body such that the inlet is in fluid communication with the reservoir body interior. The outlet is adapted to dispense the curable liquid. A piston is positioned for movement within the interior with the curable material being on one side of the piston and the opening being on an opposite side of the piston. The piston is moved by pressurized air introduced through the opening on the opposite side of the piston to urge the curable liquid from the outlet. Preferably, a stop member, such as an annular ring, is provided proximate the opening and retains the piston within the interior.

These and other features, advantages and objectives of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the details of the preferred embodiments.

FIG. 1 is a perspective view of an exemplary embodiment of a curable liquid dispensing pen of the present invention;

FIG. 2 is a perspective view of an exemplary curable liquid dispensing system, including the curable liquid dispensing pen of FIG. 1;

FIG. 3 is a cross-sectional view of the curable liquid dispensing pen of FIG. 2 taken along line 3—3;

FIG. 4 is an enlarged detail of the encircled area of FIG. 3;

FIG. 5 is a partial cross-sectional view of the curable liquid dispensing pen of FIG. 2 depicting curable liquid being dispensed from the device; and FIG. 6 is a partial cross-sectional view of the curable liquid dispensing pen of FIG. 2 depicting the removal of a reservoir from the curable liquid dispensing pen.

DETAILED DESCRIPTION

Referring to FIGS. 1–3, an exemplary curable liquid dispensing pen 10 of the present invention includes a pen body 12 and a curable liquid dispensing reservoir 14 which may be removably attached to the pen body 12. The pen body 12 includes an elongated pen barrel 16 having a first end 18 and a second end 20. The barrel 16 has an air supply passage 22 that extends from the first end 18 to the second end 20 of the barrel 16. The first end 18 of the barrel 16 is configured to mate with the dispensing reservoir 14 and the second end 20 of the barrel 16 has a coupling 24 which is adapted to receive the end of a conduit 26. The other end of the conduit 26 may be attached to a source of pressurized air whereby the pressurized air entering the second end 20 of the barrel 16 is directed through the passage 22 to the first end 18 of the barrel 16. In the exemplary embodiment shown, the pen body 12 includes a connecting element 28 which is configured to receive the curable liquid dispensing reservoir 14. The connecting element 28 secures the curable liquid dispensing reservoir 14 proximate the first end 18 of the pen barrel 16 so that the curable liquid dispensing reservoir 14 is in fluid communication with the passage 22. Pressurized air from the source may thus be directed along the passage 22 to the curable liquid dispensing reservoir 14. In the embodiment shown, the connecting element 28 includes a slot 30 shaped to receive a flange 32 on the curable liquid dispensing reservoir 14 whereby the reservoir 14 may be retained by the connecting element 28. As more clearly shown in FIG. 3, the pen barrel 16 includes a threaded portion 34 which mates with a corresponding threaded portion 36 on an interior surface 38 of the connecting element 28 so that the connecting element 28 may be screwed onto the pen barrel 16.

Referring to FIGS. 3–6, a curable liquid dispensing reservoir 14 which may be attached to the pen body 12 includes a reservoir body 40 with an interior 42 for containing the curable liquid 44 to be dispensed. Advantageously, the reservoir 14 may be sized to contain a small amount of curable liquid 44, whereby substantially all of the curable liquid 44 may be dispensed from the reservoir 14 before the curable liquid 44 cures within the reservoir 14. In an exemplary embodiment, the reservoir 14 is sized to contain about 0.25 cc of curable liquid 44 in the interior 42, however other volumes may be used depending on the application. As shown most clearly in FIG. 4, the reservoir 14 further includes a first aperture 46 which extends from the interior cavity 42 and supports an elongated tube 48 that protrudes from an end of the reservoir body 40. The tube 48 has an inlet 50 connected to the interior cavity 42 and an outlet 52 for dispensing curable liquid 44 from the reservoir 14. In the exemplary embodiment shown, the tube 48 is attached to the reservoir body 40 by a connector 54 which seats the tube 48 within the first aperture 46, however, other attachment methods may be used. Tube 48 may be formed in various diameters depending on the application and fluid characteristics, such as the viscosity of the curable liquid. In presently preferred embodiments, tube 48 may be 30–33 gauge.

A second aperture 56, opposite the first aperture 46, provides an opening for filling the interior cavity 42 with curable liquid 44 and is sized to be coupled with the first end 18 of the pen body 12. A flange 32 on the reservoir body 40 near the second aperture 56 mates with the slot 30 on the connecting element 28 to retain the reservoir 14, as described above. The reservoir 14 further includes a piston 58 which may be inserted into the interior cavity 42 at through the second aperture or opening 56. The piston 58 seals the second aperture or opening 56 after the interior cavity 42 has been filled with curable liquid 44. An annular rib 60 near the second aperture 56 provides a stop member to retain the piston 58 within the interior cavity 42.

As shown in FIG. 1, the curable liquid dispensing reservoir 14 may be provided with a shield 62 which can be removably attached to the reservoir body 40 to protect the tube 48 which protrudes from the reservoir body 40. The shield 62 may be held in place by raised ribs 64 spaced around the circumference of the reservoir body 40.

Referring to FIGS. 1 and 4–6, the first end 18 of the pen barrel 16 includes a boss 70 which protrudes from the end of the pen barrel 16 and which extends inside of the second aperture 56 of the reservoir body 40 when the reservoir 14 is attached to the connecting element 28 and the connecting element 28 is screwed onto the pen barrel 16. The pen body 12 further includes an O-ring 72 which seals the reservoir 14 and pen body 12 to prevent air leakage from the dispensing pen 10. O-ring 72 is positioned in a groove 76 on the boss 70 to seal against the reservoir 14. O-ring 74 is positioned in a groove 78 on the pen barrel 16 to provide friction against the connecting element 28 so that connecting element 28 does not spin freely.

When the curable liquid dispensing pen 10 is connected to an air supply by a conduit 26 inserted into the coupling 24 at the second end 20 of the pen barrel 16, pressurized air is directed through the passage 22 in the pen barrel 16 to the piston 58 at the second aperture or opening 56 of the curable liquid reservoir 14. As shown more clearly in FIG. 5, the pressurized air forces the piston 58 along the walls of the interior cavity 42, from the second aperture 56 toward the first aperture 46, to dispense curable liquid 44 from the outlet 52 of the tube 48. As shown in FIG. 6, when the curable liquid 44 has been fully dispensed from the reservoir 14, the connecting element 28 may be rotated relative to the pen barrel 16 to retract the boss 70 from the second aperture 56 of the reservoir 14. The reservoir 14 may then be removed from the connecting element 28. In the exemplary embodiment shown, the connecting element 28 includes a polymeric material 80 disposed circumferentially around at least a portion of the connecting element 28 to serve as a grip portion for the dispensing pen 10 and to facilitate manipulation of the connecting element 28. The pen barrel 16 may also include features to aid in gripping the dispensing pen 10. In the exemplary embodiment shown, a knurl 82 on a circumferential surface of the barrel 16 facilitates manipulation of the connecting element 28 relative to the pen barrel 16.

Referring to FIG. 2, a curable liquid dispensing system 90 incorporating the curable liquid dispensing pen 10 of the present invention includes a pen body 12, a curable liquid dispensing reservoir 14, and an air compressor 92 coupled to the curable liquid dispensing pen 10 whereby pressurized air is supplied to the curable liquid dispensing pen 10 to dispense curable liquid 44 from the reservoir 14. The compressor 92 may be part of a conventional pressurized air system in a manufacturing facility, for example, which is coupled to a controller 94 configured to provide precise dispensing of a controlled volume of curable liquid 44 by the pen 10. In the exemplary embodiment shown, the controller 94 of the present invention includes a timing device 96 and a pressure control device 98 which, together with the air compressor 92, provide a timed pulse of air to the curable liquid dispensing pen 10 to thereby dispense a controlled volume of curable liquid 44 from the pen 10. The controller 94 may comprise a single, commercially available unit, such as an EFD Series 1500 Fluid Dispenser, available from EFD, Inc., East Providence, R.I.

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

What is claimed is:

1. A curable liquid dispensing pen comprising:
   a pen body having a first end, a second end, and a passage extending from said first end to said second end, said second end adapted to be coupled to a source of pressurized air;
   a dispensing reservoir removably coupled to said first end of said pen body, said dispensing reservoir containing a curable liquid and having an opening for receiving the pressurized air from said passage and an outlet for dispensing the curable liquid;
   a piston positioned in said reservoir and adapted to be moved toward said outlet by pressurized air directed from said passage through said opening to dispense the curable liquid
   a movable connecting element coupled to said first end and configured to retain said dispensing reservoir on said first end with said dispensing reservoir in fluid communication with said passage, said connecting element including a sealing element configured to be moved into and out of sealing engagement with said opening; and
   a finger grip on said connecting element to provide a manual gripping area for a user during use of said pen in a dispensing operation and during application and removal of said reservoir with respect to said pen body.

2. The pen of claim 1, wherein said reservoir includes an inner wall and said sealing element further comprises an O-ring configured to engage and disengage said inner wall.

3. The pen of claim 1, wherein said movable connecting element is coupled to said pen body with a threaded connection such that relative rotation between said pen body and said connecting element moves said sealing element into and out of sealing engagement with said opening.

4. The pen of claim 1, wherein said dispensing reservoir includes a flange portion and said connecting element further comprises:
   a slot shaped to receive said flange portion to assist in retaining said reservoir at said first end of said pen body.

5. A system for dispensing liquid, the system comprising:
   a pen body having a first end, a second end, and a passage extending from said first end to said second end, said first end including a sealing element, said second end adapted to be coupled to a source of pressurized air;
   a dispensing reservoir removably coupled to said first end of said pen body, said dispensing reservoir containing a liquid and having an opening for receiving the pressurized air from said passage and an outlet for dispensing the liquid;
   a movable connecting element coupled to said first end and configured to retain said dispensing reservoir on said first end with said dispensing reservoir in fluid communication with said passage, said connecting element further configured to move said sealing element into and out of sealing engagement with said opening;
   a finger grip on said connecting element to provide a manual gripping area for a user during use of said pen in a dispensing operation and during application and removal of said reservoir with respect to said pen body;
   a piston positioned in said reservoir and adapted to be moved toward said outlet by pressurized air directed from said passage through said opening to dispense the liquid; and
   a controller adapted to be coupled to the source of pressurized air and operative to send a timed pulse of the pressurized air to said passage to control the volume of liquid dispensed from said reservoir.

6. The system of claim 5 wherein said controller further includes a pressure control device operative to adjust the pressure of the pressurized air.

7. A pen body for use in dispensing curable liquid from a dispensing reservoir, the pen body comprising:
   an elongate pen barrel having a first end and a second end;
   a finger grip positioned on said pen barrel between said first and second ends and configured to be gripped by a user during a dispensing operation;
   a passage through said pen barrel extending from said first end to said second end;
   a connecting element coupled to said pen barrel and configured to removably retain the dispensing reservoir proximate said first end of said pen barrel such that said dispensing reservoir is in fluid communication with said passage, said connecting element including a sealing element configured to be moved into sealing engagement with the reservoir to seal the connection between the dispensing reservoir and said passage; and
   a coupling on said pen barrel adapted to receive a conduit for supplying pressurized air to said passage;
   wherein said connecting element is coupled to said pen barrel with a threaded connection such that relative rotation between said pen barrel and said connecting element moves said sealing element into and out of sealing engagement with the dispensing reservoir.

8. The pen body of claim 7 further comprising:
   a boss on said first end of said barrel, said boss sized to fit within the dispensing reservoir and configured to receive said sealing element to sealingly couple said pen barrel to the dispensing reservoir such that said passage is in fluid communication with the dispensing reservoir.

9. The pen body of claim 7, wherein the dispensing reservoir includes a flange portion and said connecting element further comprises:
   a slot shaped to receive said flange portion to assist in retaining the dispensing reservoir at said first end of said pen barrel.

* * * * *